United States Patent
Bässler et al.

(10) Patent No.: US 11,783,088 B2
(45) Date of Patent: Oct. 10, 2023

(54) PROCESSING ELECTRONIC DOCUMENTS

(71) Applicant: INTERNATIONAL BUSINESS MACHINES CORPORATION, Armonk, NY (US)

(72) Inventors: Michael Bässler, Bempflingen (DE); Amir Jaibaji, Austin, TX (US); Jojo Joseph, Bangalore (IN); Thomas Hampp-Bahnmueller, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 947 days.

(21) Appl. No.: 16/265,079

(22) Filed: Feb. 1, 2019

(65) Prior Publication Data
US 2020/0250345 A1    Aug. 6, 2020

(51) Int. Cl.
*G06F 21/64*   (2013.01)
*G06F 21/60*   (2013.01)
*G06F 16/93*   (2019.01)

(52) U.S. Cl.
CPC .............. *G06F 21/64* (2013.01); *G06F 16/93* (2019.01); *G06F 21/604* (2013.01)

(58) Field of Classification Search
CPC ......... G06F 21/64; G06F 21/604; G06F 16/93
See application file for complete search history.

(56) References Cited

U.S. PATENT DOCUMENTS

| | | | | |
|---|---|---|---|---|
| 5,977,972 A | * | 11/1999 | Bates | G06F 3/04855 715/786 |
| 6,480,835 B1 | * | 11/2002 | Light | G06F 16/38 707/707 |
| 9,244,976 B1 | * | 1/2016 | Zhang | G06F 16/2453 |
| 9,436,742 B1 | * | 9/2016 | Hammad | G06F 16/9535 |
| 9,760,697 B1 | * | 9/2017 | Walker | G06F 21/602 |
| 2007/0112754 A1 | * | 5/2007 | Haigh | G06F 16/3322 |

(Continued)

OTHER PUBLICATIONS

Bo et al., "Iterative Classification for Sanitizing Large-Scale Datasets", IEEE Transactions on Knowledge and Data Engineering vol. 29, Issue: 3, Mar. 1, 2017, 6 pages.

(Continued)

*Primary Examiner* — Fatoumata Traore
*Assistant Examiner* — Carlton Johnson
(74) *Attorney, Agent, or Firm* — Rakesh Roy; Andrew D. Wright; Calderon Safran & Cole, P.C.

(57) ABSTRACT

A method for processing electronic documents comprises an iteration including: (i) applying, by a computer device, a first statistical test process to a first subset of the documents, the first statistical test process estimating whether or not content of the documents of the first subset comply with a predefined criterion; (ii) in response to a result of the first statistical test process, estimating, by the computer device, that the documents of the first subset do not comply with the criterion, selecting, by the computer device, a part of the documents of the first subset, and moving, by the computer device, the part of the documents to a second subset of the documents; and (iii) applying, by the computer device, a second statistical test process to the second subset of the documents, the second statistical test process calculating at least one statistical metric related to the documents of the second subset.

20 Claims, 4 Drawing Sheets

(56) References Cited

U.S. PATENT DOCUMENTS

| | | | |
|---|---|---|---|
| 2011/0047156 A1* | 2/2011 | Knight | G06N 5/02 |
| | | | 707/E17.089 |
| 2016/0134595 A1 | 5/2016 | Lavinio | |
| 2016/0359894 A1* | 12/2016 | Andrejko | G06F 40/169 |
| 2017/0185667 A1 | 6/2017 | Singh et al. | |

OTHER PUBLICATIONS

Davidovitz, "Getting random documents from ElasticSearch in a native way without code", Ran Davidovitz Blogspot, http://davidovitz.blogspot.com/2016/01/getting-random-documents-from.html, 2016, 2 pages.

Bar-Yossef et al., "Random Sampling from a Search Engine's Index", https://static.googleusercontent.com/media/research.google.com/en//pubs/archive/35211.pdf, Mar. 4, 2008, 78 pages.

"Random document in ElasticSearch", Stack Overflow, https://stackoverflow.com/questions/25887850/random-document-in-elasticsearch, accessed Jan. 7, 2019, 5 pages.

Hart et al., "Text Classication for Data Loss Prevention", 2011, 20 pages.

* cited by examiner

PROCESSING ELECTRONIC DOCUMENTS

BACKGROUND

The present invention relates in general to data processing systems, in particular to a method for processing electronic documents as well as a computer program product and a data processing system.

It is common to attempt to detect sensitive information in a document in order to obfuscate or encrypt the sensitive information before the document is transferred to another location for review, preview, etc. Such detection is typically performed using rules, lists, Xpath, etc. In this manner, an enterprise can prevent sensitive information from being seen by unauthorized persons because these parts (i.e., the sensitive information) are obfuscated/encrypted in the document. Subsets of data that are sensitive are separated from data originating at a particular source and at least a portion of the data is either obfuscated or encrypted to maintain the privacy and anonymity of the data as it is either transmitted to a target source or used for test purposes. The structural information of the data files are separated from the content components and left in plain text, before the data is transmitted, and only the content components or at least a portion of them are either obfuscated (e.g., replaced with similar or random data) or encrypted. On reaching its final destination, the content components are merged or reunited with the control components.

SUMMARY

In accordance with a first aspect of the invention, there is a computer-implemented method for processing electronic documents. In embodiments, the method comprises an iteration including: (i) applying, by a computer device, a first statistical test process to a first subset of the documents, the first statistical test process estimating whether or not content of the documents of the first subset comply with a predefined criterion; (ii) in response to a result of the first statistical test process, estimating, by the computer device, that the documents of the first subset do not comply with the criterion, selecting, by the computer device, a part of the documents of the first subset, and moving, by the computer device, the part of the documents to a second subset of the documents; and (iii) applying, by the computer device, a second statistical test process to the second subset of the documents, the second statistical test process calculating at least one statistical metric related to the documents of the second subset.

According to an embodiment of the invention it is possible, that with an investigation of an intelligent small set of analyzed documents of a larger corpus, a hint may be given if information, e.g., sensitive information, is contained and in what amount. Insight may be advantageously given into content and a risk assessment if that sort of content is allowed where it currently is stored. Advantageously, according to embodiments, it can be made reasonably sure that the documents of the larger corpus are clean and do not have sensitive data in areas where it is not allowed.

For the assumption that the corpus worked on might not be clean, a subject matter expert will be able to change the order of the statistical processes to achieve similar results. In this manner, embodiments of the invention are not restricted to the order of the steps described herein.

In another aspect of the invention, there is a computer program product for processing electronic documents, the computer program product comprising a computer readable storage medium having program instructions embodied therewith, the program instructions executable by a computer system to cause the computer system to perform a method, the method comprising an iteration including: (i) applying a first statistical test process to a first subset of the documents, the first statistical test process estimating whether or not content of the documents of the first subset comply with a predefined criterion; (ii) in response to a result of the first statistical test process, estimating that the documents of the first subset do not comply with the criterion, selecting a part of the documents of the first subset, and moving the part of the documents to a second subset of the documents; and (iii) applying a second statistical test process to the second subset of the documents, the second statistical test process calculating at least one statistical metric related to the documents of the second subset.

In another aspect of the invention, there is a system for execution of a data processing program, the system comprising: a processor, a computer readable memory, and a computer readable storage medium; and program instructions stored on the computer readable storage medium for execution by the processor via the computer readable memory. The program instructions include: program instructions to apply a first statistical test process to a first subset of the documents, the first statistical test process estimating whether or not content of the documents of the first subset comply with a predefined criterion; program instructions to, in response to a result of the first statistical test process, estimate that the documents of the first subset do not comply with the criterion, select a part of the documents of the first subset, and move the part of the documents to a second subset of the documents; and program instructions to apply a second statistical test process to the second subset of the documents, the second statistical test process calculating at least one statistical metric related to the documents of the second subset.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the corpus of the invention.

In the age of general data protection regulations and with renewed focus on compliance and privacy, organizations want to assess the various data sources they have in their enterprise and want to know if sensitive information is present in areas where it is not permitted. The problem, however, is how to review billions of documents, petabytes of data, in a reasonable period of time and for a reasonable amount of money. The illustrative embodiments described herein address this problem by providing a data processing system and a method for processing electronic documents.

The illustrative embodiments may be used to implement a method comprising an iteration including: (i) applying a first statistical test process to a first subset of the documents, the first statistical test process estimating whether or not the content of the documents of the first subset comply with a predefined criterion; (ii) in response to a result of the first statistical test, estimating that the documents do not comply with the criterion, selecting a part of the documents of the first subset and moving the part of documents to a second subset of the documents; and (iii) applying a second statistical test process to the second subset of documents, the second statistical test process calculating at least one statistical metric related to the documents of the second subset.

A method according to an embodiment of the invention addresses the problem of how to review billions of documents, e.g., petabytes of data, in a reasonable period of time and for a reasonable amount of money, reducing the two major factors, time and money, and getting to a risk assessment in just a few days or less. In embodiments, a solution comprises a combination of computer-implemented statistical methods and an intelligent separation process in between.

For the purpose of this disclosure, the term "sensitive information" is used to denote personally identifiable information (PII) or any other form of classified information that an organization has an interest to identify, act on, or protect. Examples of sensitive information include social security number, passport number, date of birth, credit card or bank account numbers, medical history, etc.

Similarly the term "data source" is used to denote a server within the organization or on the cloud (e.g., a cloud computing environment), where data assets are stored. Examples are mail servers, document management systems, enterprise content management systems, relational databases, no-SQL databases, etc.

According to aspects of the invention, the system first defines the corpus of documents that needs to be analyzed. In embodiments, this is accomplished by conducting interviews to determine what data sources, e.g., volumes like File Shares, NAS, Cloud sources, SharePoint sites, etc., an organization has and which of those should be included in the analysis. As a result the data sources corpus is defined and the number of documents and size can be counted/estimated.

According to aspects of the invention, the next step is to make sure the documents can be searched and accessed quickly. In embodiments, same data sources have out-of-the box search and access APIs (application programming interfaces). In embodiments, for other data sources a tool (e.g., StoredIQ) is used to create a metadata-only index to assess and have an overview of the data.

According to aspects of the invention, the system next creates or updates a set of analytics to identify sensitive data in a given set of documents. In embodiments, this comprises a predefined criterion in order to decide if the content of documents may be "clean" or "polluted". Typically a customer will be concerned with highly sensitive data or combinations of sensitive data that make it highly sensitive. These can usually be found with a number of different techniques, including regular expressions, checksum calculations, word lists, and concept analysis. At this point in the process the analytics are only created or updated but not yet applied to specific documents. This will be done in following steps of the process.

In embodiments, based on the interviews and the expected composition of these data sources, the user creates two data sets: first the assumed "clean" data set as a first subset of documents and second the "polluted" data set as a second subset of documents.

In an embodiment, the process is started with the clean data set. In aspects, the expectation is that this data set does not contain any sensitive information that is not allowed to reside on that type of data sources. Embodiments of the invention are utilized to prove this absence of sensitive data occurrence violations. The concept of statistical elusion may be advantageously used to provide this as a first statistical test process. Elusion usually is defined to be the proportion of predicted "negatives" that actually are "positives". Transferring this abstract definition to an embodiment, elusion is the proportion of documents that are predicted to be free-of-violation, i.e., are clean, but actually do constitute a sensitive data policy violation. Elusion is typically utilized as a quality check, much like the random sampling that manufacturers do to determine if a given process meets their standards.

To use elusion, the confidence and the acceptable error rate may be defined and then the elusion formula may be used to calculate how many documents need to be reviewed as shown by Equation (1):

$$n = \frac{\log(a)}{\log(1-c)} \quad (1)$$

where n is the number of documents that have to be reviewed, a is the acceptable error rate and c is the confidence rate. For example, for 99.9% confidence that less than 0.01% of all the documents contain highly sensitive data this would result in around 70,000 documents to review, independent of the defined document corpus size.

According to aspects of the invention, the calculated number of documents to be reviewed is then identified as a random sample from the defined document corpus. In embodiments, this set of documents is analyzed, particularly in-place, with the defined analytics and the results are checked. If the sample process does not return any hits for documents that violate sensitive data policies, a statement may be made that, with the defined confidence and error rate, the defined document corpus is "clean" (i.e., compliant with the criterion).

In embodiments, if there are findings with sensitive data violations in one or more documents within this elusion sample corpus, then an intelligent separation process takes place that separates the parent location object, i.e., the volume where the document resides from the overall corpus. In a very simple case, that could be the data source that the uncovered document is on. In a more sophisticated approach, it could be a SharePoint site, the parent file system folder, or more folder trees up, or an email box. This heuristic encapsulates the experience that policy violations are typically not evenly distributed but occur in localized clusters: If there is one violation in a given place the likelihood is higher that more documents with violations are located "nearby" (i.e., in the same parent location, e.g., same folder, mailbox, drive, share, data source, . . . ). In aspects, these locations are removed from the clean corpus and set aside for further analysis as part of the polluted set as a second subset of documents. In embodiments, after all findings are excluded, another elusion sampling run against the revised data set with a fresh set of random documents is done and the process is repeated with exclusion, until the elusion sample corpus is free of findings.

After the intelligent separation process, there is a set of documents proven to be clean, with acceptable error rate and confidence level, by elusion sampling and a second subset of documents that were excluded by the intelligent separation process.

In embodiments, focus is then laid on the second subset as a polluted documents set. For this set of data which is deemed to contain some sensitive data, statistical sampling is done as a second statistical test process using the formula shown in Equation (2):

$$\text{sample size} = \frac{z^2 * p * \frac{(1-p)}{e^2}}{1 + \left(z^2 * p * \frac{(1-p)}{e^2} * N\right)} \tag{2}$$

where
N is the population size,
e is the margin of error,
z is the z score (number of standard deviations above or below the mean a data point is),
p is the expected probability that a document is polluted {50% may be used for the worst case approximation, if the expected value is not known).

Defining the confidence level and probability of error, along with the type of sensitive information to be discovered, in embodiments the system employs the technique of statistical sampling to identify those data sources with higher probability of a given type of sensitive information. In aspects, sensitive information is also classified into broad category such as high sensitivity, medium sensitivity and low sensitivity, and the system provides a compliance dashboard showing the distribution of different type of sensitive information in each of the data source.

In implementations, a true random sample is identified that represents the entire corpus so that the calculations are still valid. There are several ways in which this can be done. At least two exemplary ways may be used in embodiments in which this random sample is obtained from a data source. In the first example, a local data source, such as an NFS drive mounted on to the local file system, is considered. In this case, the set of file node ids (IDs) using the operating system can be extracted. It is possible to select a random subset for example by generating random file ids based on an algorithm suitable for the id system used by the file system in question.

In the second example, a customer trying to assess a remote data source for the presence of sensitive information is considered. In this case there is no easy and obvious way to get a true random sample of documents. Therefore a stratified sampling process is applied, that will achieve the same effect of random sampling.

In embodiments, this stratified sampling process comprises an iteration including: (i) ensuring that documents are in the volume for a predefined time period; (ii) splitting the time period into time windows of fixed size, creating a set of documents per time window; (iii) selecting a number of random values for each time window and identifying documents created in a sequence according to the random values; and (iv) selecting a unique document from each time window.

In embodiments, by utilizing an appropriate analysis technology such as StoredIQ, only a very small subset of documents in the different statistical methods are analyzed in depth to do a risk assessment for a large petabyte corpus of data in only a few days.

Advantageously, embodiments provide a way to get to the statistical sample when using the search engine APIs directly. For example, when using elastic search, the API of that can be directly leveraged to retrieve a sample set of documents, as this is a feature of elastic search. But this only works if the application has control of the search index. Another feature of embodiments is how to get to a real random sample of documents that may be reviewed by using a query language interface only. The query language interface only guarantees that existing indexes that are already present can be leveraged. Iterating over all documents and picking out of the millions a random number of n documents to review would be very time consuming. By using a query language interface, the aim is to query for just n documents that are picked randomly. This can be achieved for example by using an elastic search random sample process.

According to aspects of the invention, on a regular basis, the analytics utilized for identifying sensitive data are run through a quality check. In embodiments, this is done utilizing false negative testing. For example, in this stage a sample of potentially polluted documents are taken. In this example, all documents that are found to have sensitive data based on the existing analytics are excluded. Then the remaining documents are manually reviewed. If, during this analysis, additional documents are found that contain sensitive data the analytics, i.e., the predefined criterion if data are compliant, are updated in order to find this type of sensitive data going forward.

Figure 1:
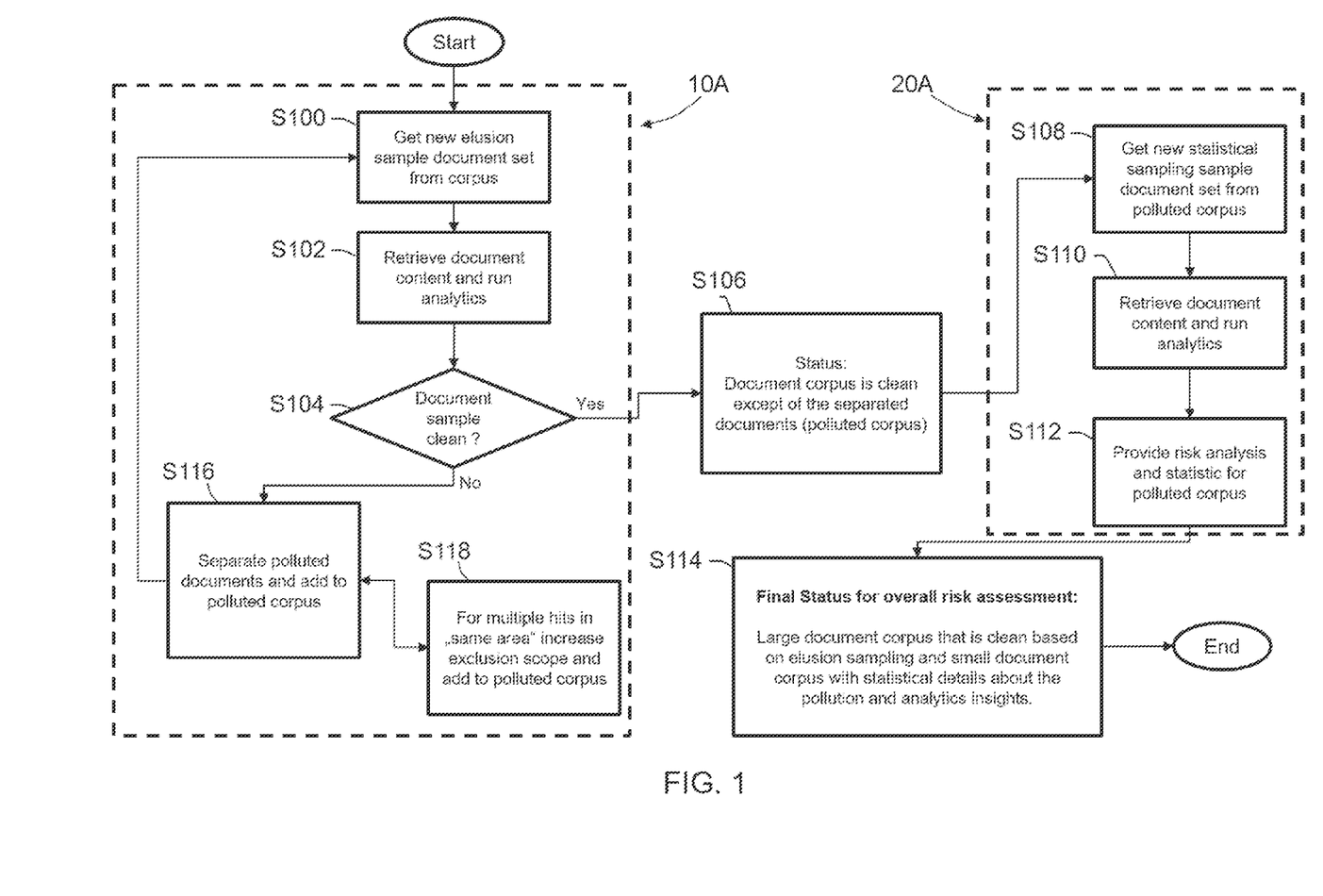
FIG. 1 depicts a flow chart for processing electronic documents according to an embodiment of the invention.

FIG. 1 depicts a flow chart for processing electronic documents according to an embodiment of the invention. In embodiments, the method comprises an iteration including applying a first statistical test process 10A to a first subset of the documents. The first statistical test process estimates whether or not the content of the documents of the first subset comply with a predefined criterion, such as, e.g., if documents with sensitive information are contained in the first subset. In response to a result of the first statistical test 10A, estimating that the documents do not comply with the criterion, a part of the documents of the first subset are selected and the part of documents moved to a second subset of the documents. A second statistical test process 20A is applied to the second subset of documents. The second statistical test process 20A calculates at least one statistical metric related to the documents of the second subset. The iteration is repeated until the first statistical test process 10A estimates that the documents of the first subset comply with the predefined criterion.

In embodiments, the first statistical test process 10A is advantageously an elusion sampling process and the second statistical test process 20A is a random sampling process.

According to embodiments, the first statistical test process 10A is started in step S100 by getting a first subset of documents from a corpus of documents as a new elusion sample document set according to a given specification. In step S102, document content is retrieved and analytics run, e.g., a detection for sensitive data as a predefined criterion. This analytics run is iterated for the whole first subset of data. Next in step S104 analytics results are verified. If the document sample as a first subset is not "clean", i.e., does not comply with the predefined criterion, the documents that are not clean are separated in step S116 from the first subset, and excluded to second subset of documents, a so-called "polluted" corpus of data, which may be implemented differently per volume type. For multiple hits in the corpus of documents the elusion corpus is increased per volume type and added to the polluted corpus in step S118.

If the first subset is estimated to be clean in step S104, then the status of the first subset of documents is set to clean in step S106 according to the criterion, except the separated documents of the second subset, the polluted corpus.

Next in step S108 the second statistical test process 20A is started by getting a sample document set from the second subset, the polluted corpus. Document content is retrieved in step S110 and analytics according to the predefined criterion run. In step S112, analysis results are prepared and a risk analysis and at least one statistical metric for the second subset of documents provided.

This leads to a final status for overall risk assessment in step S114, namely a large document corpus as a first subset that is clean based on elusion sampling as a first statistical test process 10A and a small document corpus as a second subset with statistical details about the pollution, the degree that documents do not comply with the predefined criterion as well analytics insights. The fraction of documents of the respective first subset to be analyzed by the first statistical test process 10A, for a predefined confidence level, is lower compared to the corresponding fraction of documents to be analyzed by the second statistical test process 20A.

Selecting the part of the documents as polluted document out of the corpus of documents may comprise selecting a first document of the first subset that does not comply with the predefined criterion and selecting at least one further document related to the first document.

If the documents are organized in a document hierarchy in the corpus of documents, selecting the at least one further document may be based on a location of the first document within the document hierarchy.

Figure 2:
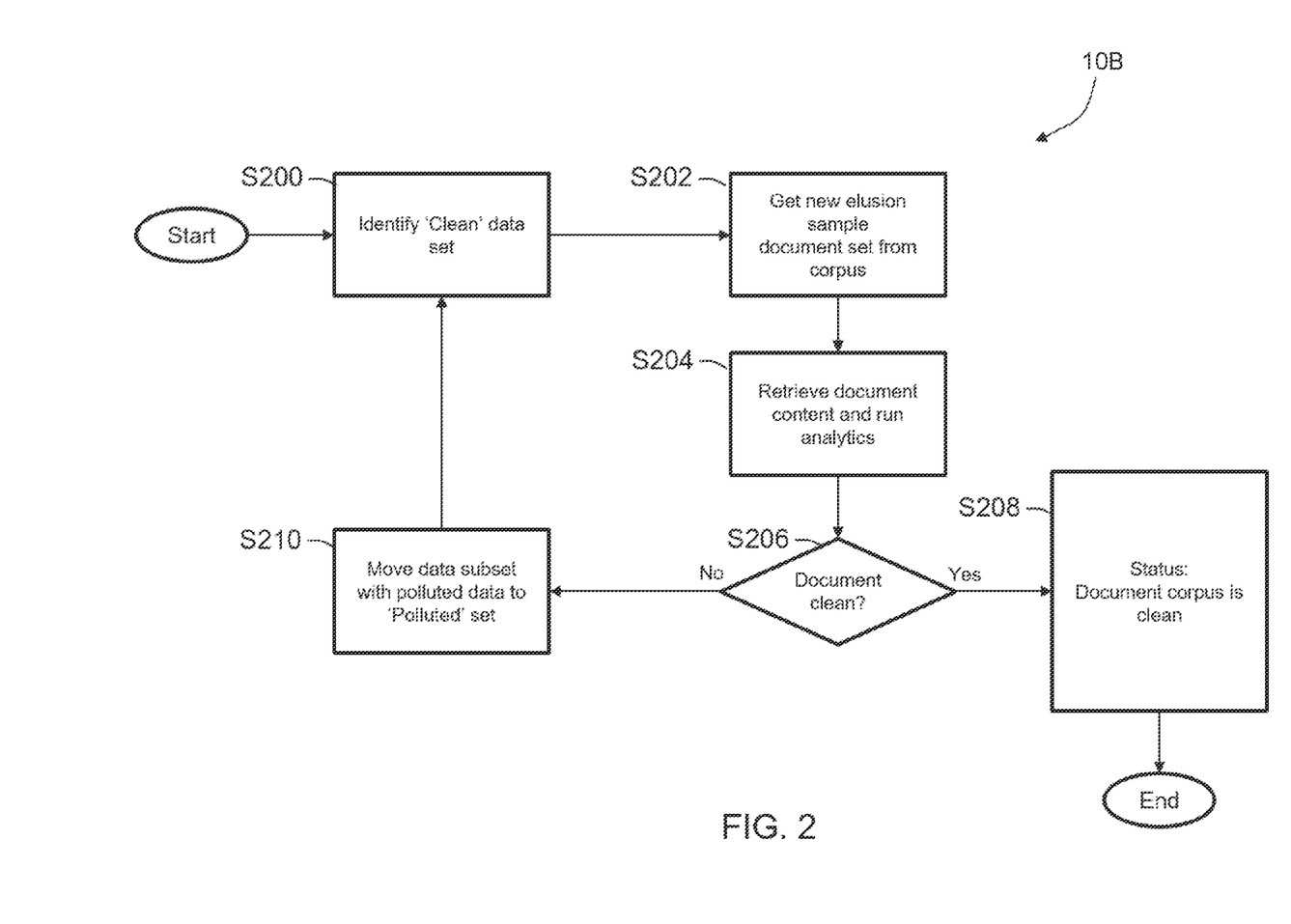
FIG. 2 depicts a flow chart for a first statistical test process according to an embodiment of the invention.

FIG. 2 depicts a flow chart for a first statistical test process 10B according to an embodiment of the invention. In embodiments, the first statistical test process 10B, which preferably comprises an elusion sampling process, starts by identifying a clean data set in step S200, followed by getting a first subset of documents from the corpus of documents as the new elusion sample document set in step S202. Next in step S204 document content is retrieved and analytics is run in order to investigate if the documents comply with the predefined criterion, e.g. as a detection for sensitive data. In step S206 it is checked if the document subset is clean, i.e. complies with the criterion. If this is not the case, the subset is moved with the polluted data to a second subset of polluted data in step S210 and the process 10B continues with step S200 from the beginning again. It the subset is clean, the status for the subset to be clean is stated in step S208 and the first statistical test process 10B is ended.

Thus, in response to a result of the first statistical test process 10B, estimating that documents of the first subset do not comply with the criterion, a volume may be selected where the documents are stored and the documents of this volume may be moved to a second subset of the documents.

Figure 3:
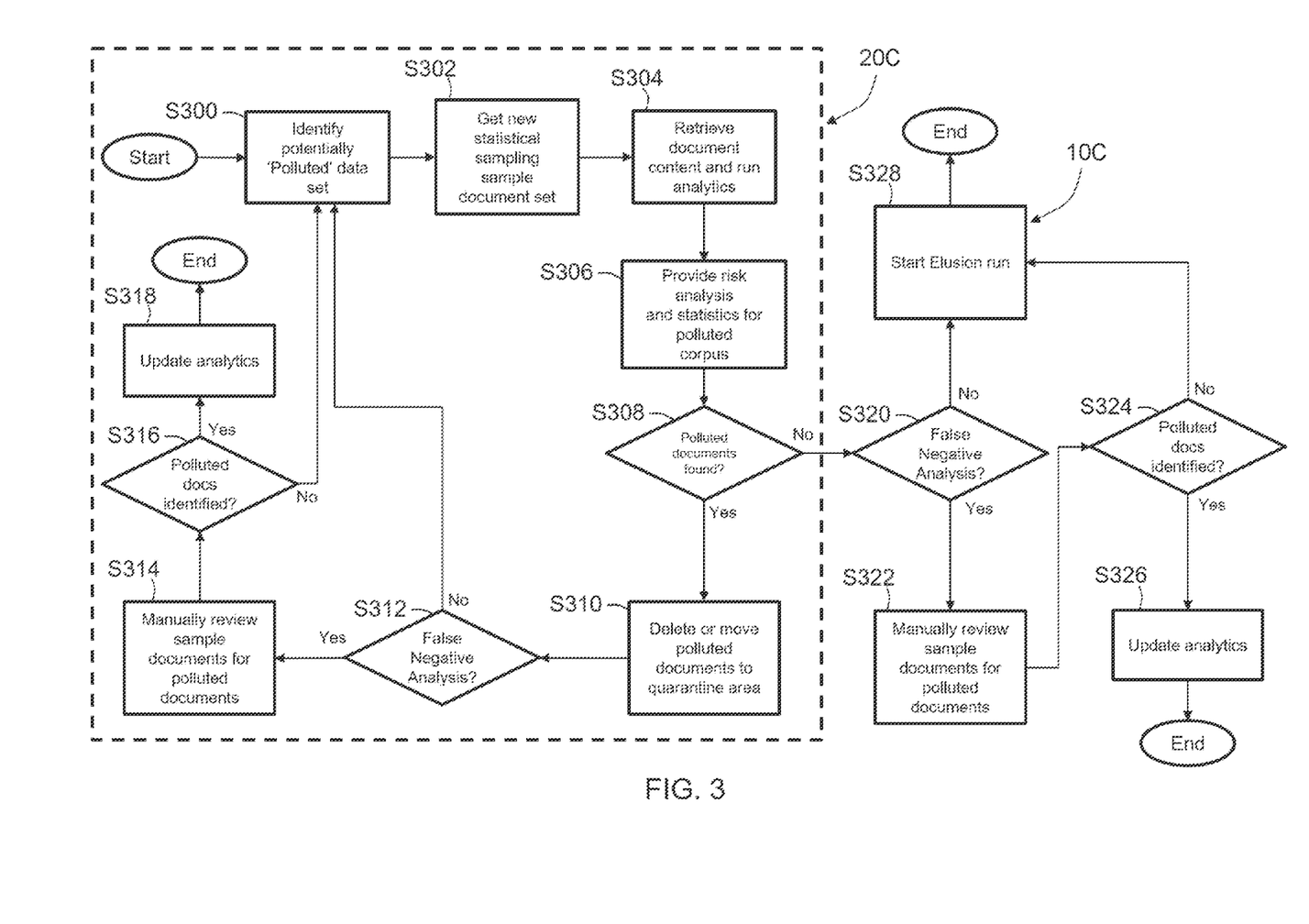
FIG. 3 depicts a flow chart for a second statistical test process according to an embodiment of the invention.

FIG. 3 depicts a flow chart for a second statistical test process 20C according to an embodiment of the invention. In embodiments, the second statistical test process 20C, which preferably comprises a random sampling process, starts with step S300 by identifying a second subset as a potentially polluted data set, followed by getting a new statistical sampling sample document set in step S302 and retrieving the document content in step S304 and running analytics in order to decide if the documents comply with the predefined criterion. In step S306 the analysis results are prepared and a risk analysis as well as a statistical metric provided for the polluted corpus. If polluted documents are found in step S308, then an appropriate clean-up or remediation action may optionally be applied at this point (e.g., the polluted documents could be deleted or moved to a so-called quarantine area in step S310). Then a false negative analysis is performed in step S312 if there are no more polluted documents. If still polluted documents are found, in step S314 remaining sample documents are manually reviewed, looking for polluted documents.

If still polluted documents are identified in step S316, the predefined criterion in the analytics is updated in step S318 and the second statistical test process 20C is ended. Thus, if further documents are found which do not comply with the criterion, the predefined criterion is updated.

If this is not the case the process 20C continues with step S300 from the beginning.

If the false negative analysis in step S312 is negative the process 20C continues with step S300 from the beginning, too.

If no polluted documents are found in step S308, the process 20C continues with another false negative analysis in step S320. If the result is negative the flow continues with the start of another elusion process as the first statistical test process 10C in step S328.

If the false negative analysis is positive in step S320, sample documents are manually reviewed, looking for polluted documents in step S322. If polluted documents are identified in step S324, the predefined criterion in the analytics is updated in step S326 and the second statistical test process 20C is ended. If this is not the case, the flow continues by starting another elusion run in step S328.

Figure 4:
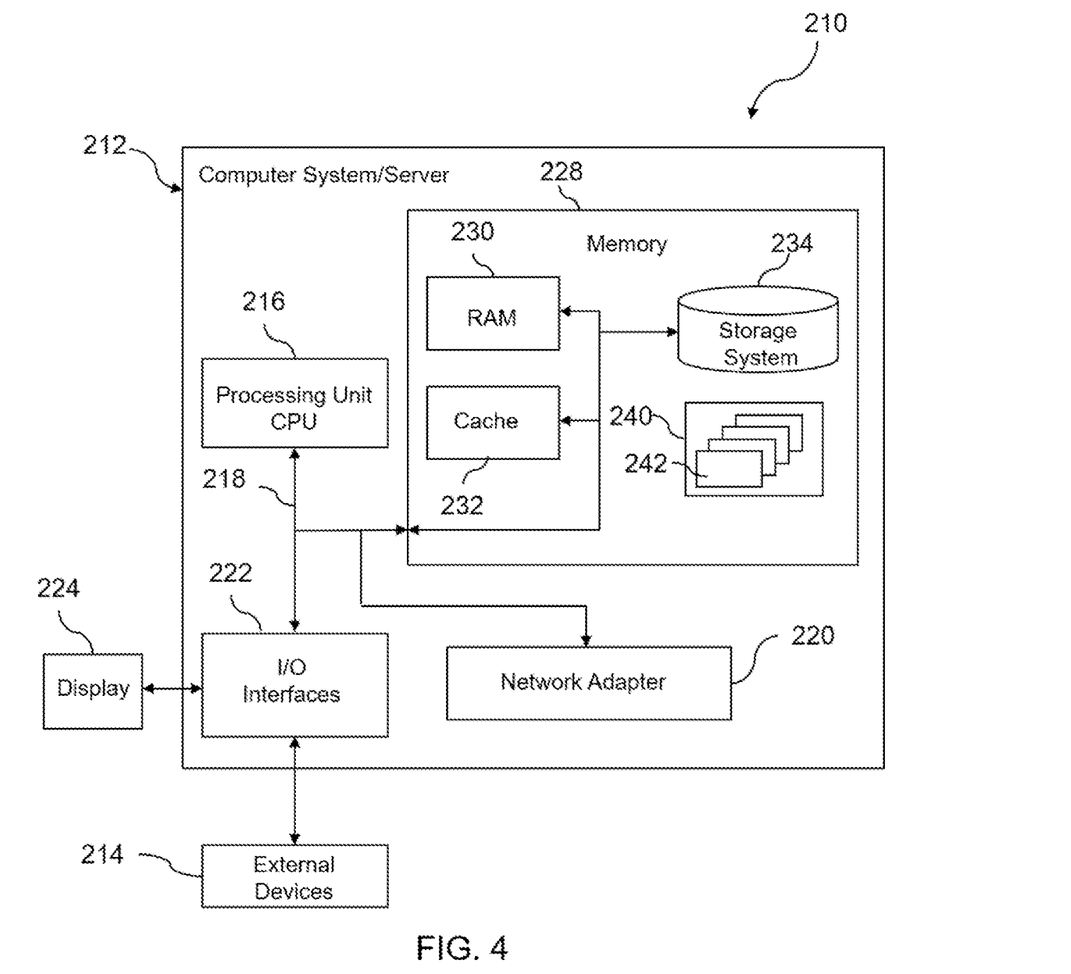
FIG. 4 depicts an example embodiment of a data processing system for executing a method according to an embodiment of the invention.

Referring now to FIG. 4, a schematic of an example of a data processing system 210 is shown. Data processing system 210 is only one example of a suitable data processing system and is not intended to suggest any limitation as to the corpus of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the corpus and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
    applying, by one or more processing devices, a first statistical test process to a first subset of electronic documents, the first statistical test process estimating whether or not content of the documents of the first subset complies with a predefined criterion that identifies sensitive information;
    in response to a result of the first statistical test process estimating that the documents of the first subset do not comply with the criterion, selecting, by the one or more processing devices, a part of the documents of the first subset, and moving, by the one or more processing devices, the part of the documents to a second subset of the documents; and
    applying, by the one or more processing devices, a second statistical test process to the second subset of the documents, the second statistical test process calculating at least one statistical metric related to the documents of the second subset,
    wherein the first statistical test process comprises an elusion sampling process and the second statistical test process comprises a random sampling process, and
    wherein the elusion sampling process comprises using an elusion formula to calculate how many documents to review in accordance with an equation in which a number of documents to review is based on an acceptable error rate and a confidence rate.

2. The method according to claim 1, wherein the method comprises one or more iterations, in which each iteration comprises the (i) applying, by the one or more processing devices, a first statistical test process to a first subset of the documents, the first statistical test process estimating whether or not content of the documents of the first subset complies with a predefined criterion indicative of sensitive information; the (ii) in response to a result of the first statistical test process estimating that the documents of the first subset do not comply with the criterion, selecting, by the one or more processing devices, a part of the documents of the first subset, and moving, by the one or more processing devices, the part of the documents to a second subset of the documents; and the (iii) applying, by the one or more processing devices, a second statistical test process to the second subset of the documents, the second statistical test process calculating at least one statistical metric related to the documents of the second subset,
    the method further comprising repeating the one or more iterations until the first statistical test process estimates that the documents of the first subset comply with the predefined criterion.

3. The method according to claim 1, wherein a fraction of the documents of the first subset to be analyzed by the first statistical test process, for a predefined confidence level, is lower compared to a corresponding fraction of the documents to be analyzed by the second statistical test process.

4. The method according to claim 1, wherein the selecting the part of the documents comprises selecting a first document of the first subset that does not comply with the predefined criterion and selecting at least one further document related to the first document.

5. The method according to claim 4, wherein the documents are organized in a document hierarchy, and wherein the selecting the at least one further document is based at least in part on a location of the first document within the document hierarchy.

6. The method according to claim 1, wherein, in response to finding a document, during the second statistical test process, which does not comply with the predefined criterion, the document is made a subject of a remediation process, wherein the making the document the subject of the remediation process comprises moving the document to a quarantine area.

7. The method according to claim 1, further comprising performing a false negative analysis as part of the second statistical test process on the second subset,
wherein, in response to further documents being found which do not comply with the criterion, a manual review process is used for identifying documents that do not comply with the predefined criterion,
further comprising, in response to still further documents being found which do not comply with the predefined criterion, updating the predefined criterion.

8. The method according to claim 1, further comprising, in response to a result of the first statistical test process estimating that documents of the first subset do not comply with the predefined criterion, selecting a volume where the documents are stored, and moving documents of the volume to the second subset of the documents.

9. The method according to claim 1, further comprising analyzing a remote volume of documents using a stratified sampling process, wherein the stratified sampling process comprises an iteration including:
ensuring that documents are in the remote volume for a predefined time period;
splitting the time period into time windows of fixed size, creating a set of documents per time window;
selecting a number of random values for each time window and identifying documents created in a sequence according to the random values; and
selecting a unique document from each time window.

10. The method according to claim 1, further comprising using a random sampling functionality for querying for a fixed number of documents that are picked randomly, wherein the random sampling functionality comprises an elastic search random sampling process.

11. The method according to claim 1, further comprising using directory information of a document hierarchy for identifying a random sample of documents to be analyzed.

12. The method according to claim 1, further comprising, for the second statistical test process, specifying at least one of a confidence level and a probability of error for identifying documents that do not comply with the predefined criterion.

13. The method of claim 1, wherein the predefined criterion that identifies sensitive information comprises a predefined criterion that identifies one or more selected from the group consisting of: personally identifiable information, classified information, or information that an organization has an interest to protect.

14. The method of claim 1, wherein the predefined criterion that identifies sensitive information comprises a predefined criterion that identifies personally identifiable information.

15. The method of claim 1, wherein the predefined criterion that identifies sensitive information comprises a predefined criterion that identifies classified information.

16. The method of claim 1, wherein the predefined criterion that identifies sensitive information comprises a predefined criterion that identifies information that an organization has an interest to protect.

17. The method of claim 1, wherein the elusion formula to calculate how many documents need to be reviewed is in accordance with the equation:

$$n = \frac{\log(a)}{\log(1-c)}$$

where n is the number of documents to review, a is the acceptable error rate, and c is the confidence rate.

18. A computer program product comprising a computer readable storage medium having program instructions embodied therewith, the program instructions executable by a computer system to cause the computer system to perform a method, the method comprising:
applying a first statistical test process to a first subset of the documents, wherein the first statistical test process comprises an elusion sampling process, the first statistical test process estimating whether or not content of the documents of the first subset complies with a predefined criterion that identifies sensitive information;
in response to a result of the first statistical test process estimating that the documents of the first subset do not comply with the criterion, selecting a part of the documents of the first subset, and moving the part of the documents to a second subset of the documents;
applying a second statistical test process to the second subset of the documents, wherein the second statistical test process comprises a random sampling process, the second statistical test process calculating at least one statistical metric related to the documents of the second subset,
wherein the elusion sampling process comprises using an elusion formula to calculate how many documents to review in accordance with an equation in which a number of documents to be reviewed is based on an acceptable error rate and a confidence rate.

19. The computer program product of claim 18, wherein the elusion formula to calculate how many documents need to be reviewed is in accordance with the equation:

$$n = \frac{\log(a)}{\log(1-c)}$$

where n is the number of documents to review, a is the acceptable error rate, and c is the confidence rate.

20. A system comprising:
a processor, a computer readable memory, and a computer readable storage medium; and
program instructions stored on the computer readable storage medium for execution by the processor via the computer readable memory, wherein the program instructions include:

program instructions to apply a first statistical test process to a first subset of the documents, wherein the first statistical test process comprises an elusion sampling process, the first statistical test process estimating whether or not content of the documents of the first subset complies with a predefined criterion that identifies sensitive information, program instructions to, in response to a result of the first statistical test process estimating that the documents of the first subset do not comply with the criterion, select a part of the documents of the first subset, and move the part of the documents to a second subset of the documents, and program instructions to apply a second statistical test process to the second subset of the documents, wherein the second statistical test process comprises a random sampling process, the second statistical test process calculating at least one statistical metric related to the documents of the second subset, wherein the elusion sampling process comprises using an elusion formula to calculate how many documents need to be reviewed in accordance with the equation:

$$n = \frac{\log(a)}{\log(1-c)}$$

where n is a number of documents that have to be reviewed, a is an acceptable error rate, and c is a confidence rate.

* * * * *